May 31, 1955        H. E. HULL        2,709,324

METHOD AND APPARATUS FOR PRODUCING SAW BLADES

Filed Jan. 28, 1950        3 Sheets-Sheet 1

INVENTOR.
Henry E. Hull

BY Adams, Stevens & Mase

AGENTS.

May 31, 1955  H. E. HULL  2,709,324
METHOD AND APPARATUS FOR PRODUCING SAW BLADES
Filed Jan. 28, 1950  3 Sheets-Sheet 2

INVENTOR.
Henry E. Hull
BY Adams, Stevens & Mase
AGENTS.

May 31, 1955   H. E. HULL   2,709,324
METHOD AND APPARATUS FOR PRODUCING SAW BLADES
Filed Jan. 28, 1950   3 Sheets-Sheet 3
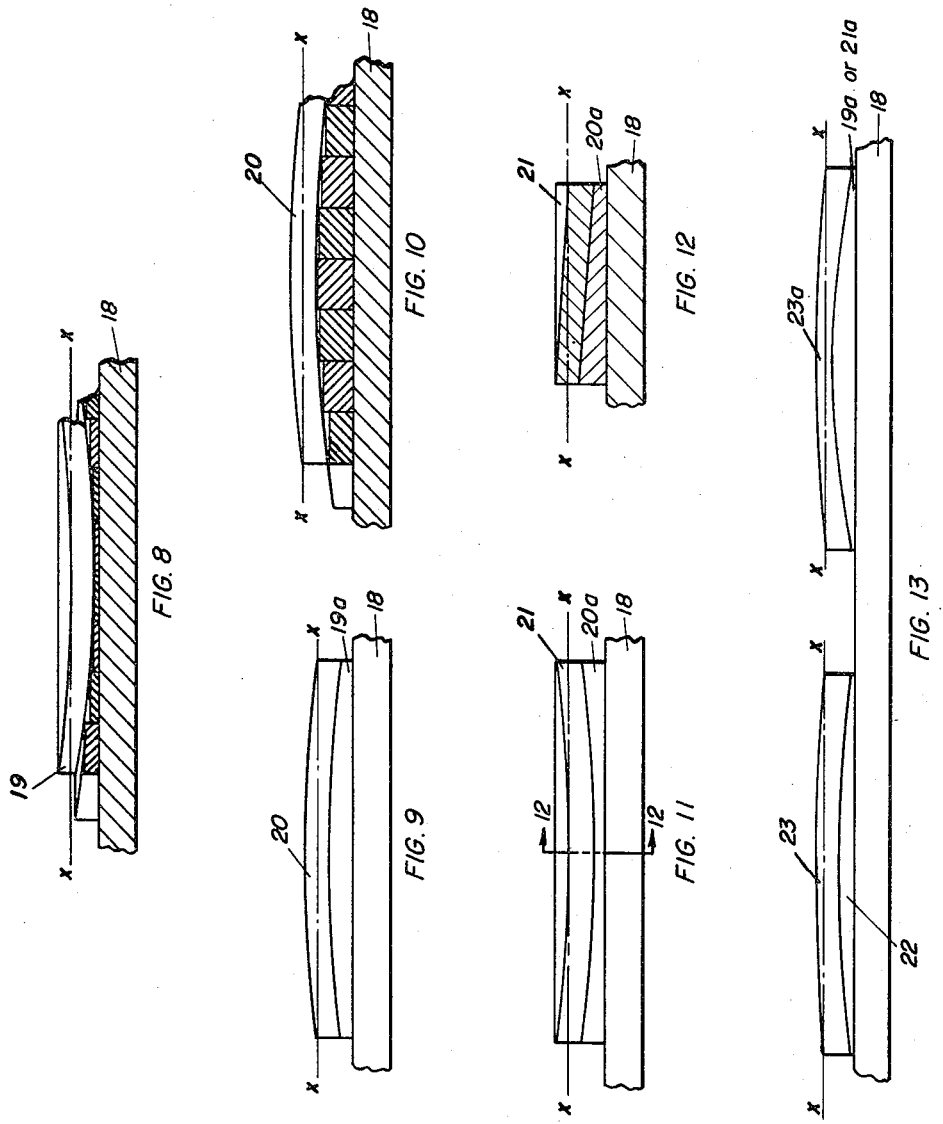
INVENTOR.
Henry E. Hull
BY Adams, Stevens & Mase
AGENTS.

United States Patent Office 2,709,324
Patented May 31, 1955

2,709,324

METHOD AND APPARATUS FOR PRODUCING SAW BLADES

Henry E. Hull, Worthington, Ohio, assignor, by mesne assignments, to Rockwell Manufacturing Co., a corporation of Pennsylvania Application January 28, 1950, Serial No. 141,080

8 Claims. (Cl. 51—216)

This invention pertains to a method and apparatus for producing a saw blade. For illustrative purposes, the invention will be hereinafter described in connection with a method and an apparatus for producing a crosscut saw blade, although the invention is obviously not limited thereto.

It is highly desirable in a crosscut saw blade that such blade be so tapered that it will not bind as the cut moves into a log. It is also advantageous to have the blade so constructed that it will run with a minimum of set, thus reducing the width of the cut, or kerf, saving lumber and requiring less pressure and pull on the part of the user. More specifically it is highly desirable that the blade should taper from the ends of the blade toward the center of the blade along the back edge in saws having wide centers, and should also taper from the toothed edge of the blade to the back edge thereof, the toothed edge of the blade being of the same thickness throughout its length. In other words, the saw blade, while having a toothed edge which is of the same thickness throughout its length, will have a body portion that is thinnest at the back edge of the widest portion of the blade, generally at the center of the blade, becoming gradually thicker towards the toothed edge and becoming progressively thicker from the center of the back edge towards the ends of the blade. Since the toothed edge of a crosscut saw blade customarily forms an arc of a circle, the thickness of the saw blade of this invention, when measured at a given distance from the toothed edge along any radius of the arc formed by the toothed edge, will be the same. This type of taper on a crosscut saw blade is known as "radial arc" grinding.

Heretofore, the production of any taper such as this on a cross-cut saw blade has been a time-consuming operation. In usual practice a template is laboriously made by hand, such template being ground to at least simulate a compound taper, a saw blade blank is laid upon the template, and the saw blade blank and template together are moved back and forth manually under the surface of a grinding stone or wheel with variant pressure being exerted on the saw blade blank and template by a roller beneath the template. The amount of stock ground from the saw blade blank has been dependent upon the human element in that the operator manually varies the amount of pressure exerted on the saw blade blank and template by the roller. This results in considerable variation in thickness and taper of the saw blade blank.

It is one object of this invention to provide a method and apparatus for producing a saw blade, in which the apparatus and method is such that a blade produced from a template will have a radial arc taper and in which the sides of the saw blade taper evenly.

It is another object of this invention to provide a method and apparatus for producing a saw blade in which the degree of the taper and the amount of stock removed from the saw blank by a grinding operation may be determined mechanically rather than manually.

It is another object of this invention to provide a template for producing saw blades which will permit the production of a plurality of blades mechanically and in multiple rather than one blade at a time, and in which the blades produced will have a tolerance variation within extremely close limits.

A further object of this invention is to provide an apparatus for producing a saw blade which is simple in construction, easy to manipulate, and which lends itself to the making of a saw blade in which all sections taken through the blade normal to the toothed edge will be trapezoids having equal widths at points equidistant from the toothed edge.

Various other objects and advantageous features of the invention may be had from the following description when taken in conjunction with the accompanying drawings wherein similar characters of reference designate corresponding parts, and wherein:

Figure 8 is a view taken on the line 8—8 of Figure 6, showing a portion of the apparatus for producing a template from which master saw blanks may be made or from which saw blades may be ground to shape.

Figure 9 is a view showing the apparatus arranged for using templates to produce saw-blade blanks or a master saw blade.

Figure 10 is a view similar to Figure 8, but showing the apparatus arranged for directly producing a saw-blade blank or a master saw blank from which templates may be made.

Figure 11 is a view showing the apparatus arranged for producing templates from a master saw blank.

Figure 12 is a view taken along 12—12 of Figure 11.

Figure 13 is a view showing the grinding operation on a saw-blade blank, utilizing templates as produced by the grinding operation shown in Figure 8 or utilizing templates made from master saw blanks produced by the grinding operations shown in Figures 9, 10, and 11.

Figure 1:
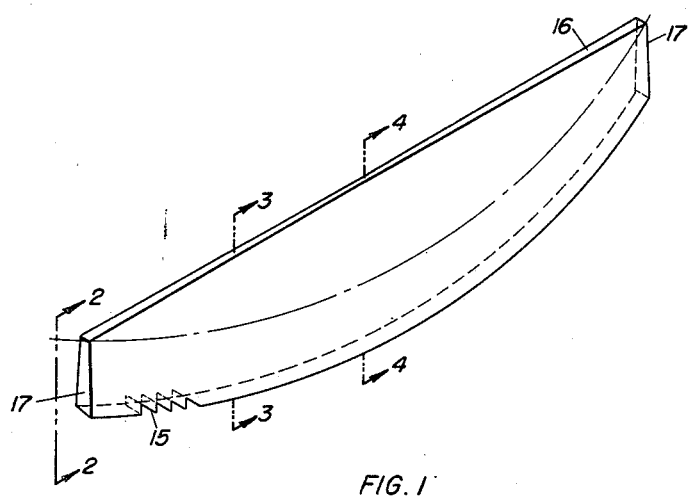
Figure 1 is a perspective view of a crosscut saw blade having the features of and produced in accordance with the ideas disclosed by this invention.

Referring to Figure 1, there is shown a crosscut saw blade, produced in accordance with the ideas disclosed by this invention which includes a toothed edge 15, a back edge 16, and the handle ends 17. When viewed from the side the back edge 16 is straight while the toothed edge 15 is curved and forms an arc of a circle.

Figures 2, 3, 4:
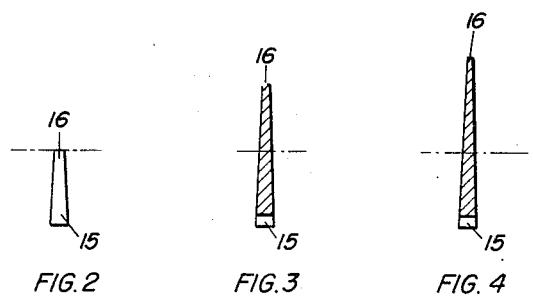
Figure 2 is a view taken on the line 2—2 of Figure 1.
Figure 3 is a view taken on the line 3—3 of Figure 1.
Figure 4 is a view taken on the line 4—4 of Figure 1.

The toothed edge 15 remains the same thickness throughout its length, while the back edge tapers toward the center from the ends 17. The thickness of the blade tapers from the toothed edge 15 to the back edge 16 in such a manner that cross sections of the blade taken at right angles to the toothed edge 16 will, in general, have the form of trapezoids having the same width at any given distance from the toothed edge 15. This is shown by Figures 2, 3, and 4 of the drawings.

Referring to Figures 5 to 13, inclusive, there is illustrated the apparatus and method of this invention by which a saw blade, having the characteristics and general configuration of the saw blade shown in Figure 1, may be produced, or by which master saw blanks or templates may be produced whereby saw blades may be produced from each of the templates individually or from a plurality of the latter templates collectively. Referring to Figures 8 to 13, inclusive, the numeral 18 represents the bed of a magnetic chuck to which metal having the proper characteristics may be clamped by magnetic action.

Figure 5:
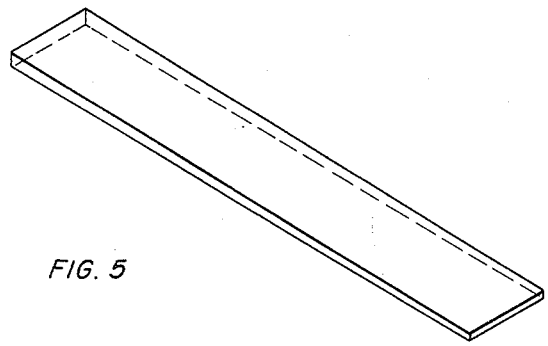
Figure 5 is a perspective view of a tapered strip used in the initial grinding step for producing a master template from which other templates may be produced, or saw blades ground to shape.

In accordance with the present invention there is provided a plurality of tapered strips, each of which is rectangular in plan, one of which is shown in Figure 5. It has been found that three sets of such strips, having respectively tapers of 1, 1½ and 4½ thousandths of an inch per inch of length, or mils per inch, as such measurements will hereinafter be described, are satisfactory to produce all of the common styles of crosscut saws as will later be described. However, it is not intended to limit the invention to any particular sizes of strips.

Figure 6:
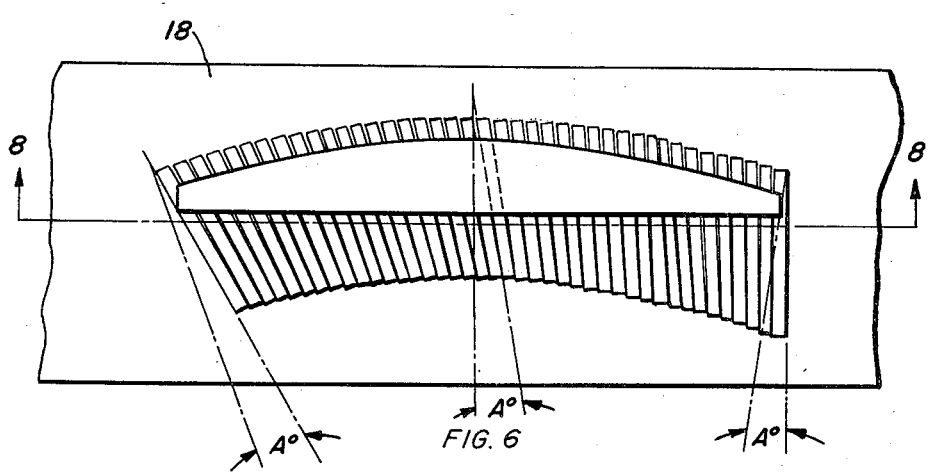
Figure 6 is a plan view showing the apparatus for generating a compound taper on a saw blade, or on a saw blade template from which a plurality of saw blades may be produced.

Figure 6 illustrates the use of these strips in practicing the invention. In the use of this apparatus let it be assumed that the surface of the sheet bearing Figure 6 represents the surface of a magnetic chuck. A set or combination of sets of identical strips are placed in edge-to-edge relation flat on the surface of the chuck in a somewhat fanwise position in order to give the taper desired for the saw blade. In other words, the strips are so disposed that one set of similar ends are touching and the other ends are slightly separated so that the strips will coincide with radii of the arc formed by the circular edge of the saw blank to be ground. When the strips are in this position, it can be seen that a plane superimposed on the upper surfaces of the strips would have a warped surface.

Figure 7:
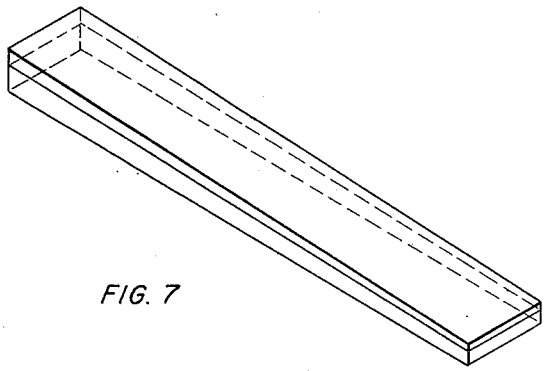
Figure 7 is a perspective view of a combination of several tapered strips to secure a desired taper.

When the three sets of tapered strips hereinbefore described are available, tapers of 1, 1½ and 4½ mils per inch can be formed by the strips themselves. Likewise, two or all three of the sets of strips may be combined to give other degrees of taper. Thus, the combination of a strip having a taper of 1 mil per inch laid on top of a strip having a taper of 1½ mils per inch will give a combined taper of 2½ mils per inch. A combination of two strips is shown by Figure 7. Also, a strip having a taper of 4½ mils per inch on which is placed in a position of reversed taper a strip having a taper of 1 mil per inch will give a combined taper of 3½ mils per inch. Finally, any desired degrees of taper, whose values lie between those formed by one or more strips, can be secured by placing the strips or combinations of strips at an angle with the radii of the arc formed by the circular edge of the saw blank to be ground. Such an angle is shown by "A" in Figure 6. Thus while a strip having a taper of 1 mil per inch positioned on top of a strip having a taper of 1½ mils per inch will give a combined taper of 2½ mils per inch, by placing the combination of strips at an angle of 16° it is possible to form a taper of 2.6 mils per inch when measured along the radii of the arc formed by the circular edge of the saw blank.

Referring again to Figure 6, an outline generally representing the shape of the saw blade or template to be made, is marked on the surface of the chuck as, for example, by chalk or other means. Since, as hereinbefore described, a radical-arc ground saw blade tapers evenly along a line drawn normal to the toothed edge of the blade, the tapered strips are laid on the chuck either normal to the line marking the toothed edge of the saw or at a constant angle to normal lines as represented by the angle "A" in Figure 6.

To produce a template directly from the tapered strips, plate 19 of the same shape but slightly larger than the saw blades to be made is laid upon the strips which have been placed on the magnetic chuck in a slightly fanwise position so that their thick ends lie along a convex arc. Referring to Figure 8, this plate 19 is clamped and held on to the strips by the magnetic action of the chuck 18. The magnetic pull of the chuck 18 serves to pull the plate 19 down on to the strips hereinbefore described so that the upper surface of the plate 19 is warped by such pull to follow the contour of the compound tapered surface formed by the upper surfaces of the strips. After this is accomplished, a grinding wheel, which may move back and forth across the magnetic chuck automatically, and may or may not be manually or automatically adjustable to vary the depth of cut at the end of each pass, is passed back and forth across the plate 19 to grind off the desired amount of such plate. As a result of such grinding, the edge of plate 19 resting upon the thinner ends of the tapered strips will be the thickest part of the plate, and those parts of the plate resting upon the thicker portions of the tapered strips will be the thinner parts of the ground plate. The upper surface will be flat, as indicated by the lines $x$—$x$. When the converse of the warped surface defined by the upper surfaces of the strips has been produced in the manner just described, the pull of the magnetic chuck is released and the plate and the strips are removed therefrom. The ground plate, hereinafter referred to as template 19a, will have a surface which is the converse of the warped surfaces defined by the uppermost surfaces of the strips hereinbefore described.

A master saw blank, from which a plurality of templates can be made, may be produced either by use of the template 19a as shown in Figure 9, or directly by use of the tapered strips placed so that the thinner ends lie along the convex arc.

To produce a saw blank by use of the template 19a, the template is positioned on the magnetic chuck, as shown in Figure 9. Then a plate 20, identical in size and shape with plate 19 is placed on top of template 19a and the entire assembly is clamped on the magnetic chuck 18 by magnetic pull. A grinding wheel is passed back and forth across the surface of plate 20 until it is ground flat as previously described. Since the thicker portion of the plate 19a is in the center, the grinding wheel which moves in a straight line parallel to the surface of the magnetic chuck will take a greater cut from its center of the plate 20 than at the ends thereof, resulting in a plate having one flat surface and the other surface thereof contoured in exact replication of the warped surfaces defined by the uppermost surfaces of the strips as arranged in Figure 8. Following the grinding of the plate 20 in the manner hereinbefore described, the assembly of the template 19a and the ground plate is removed from the magnetic chuck. This ground plate may be used as a finished saw blank or may be used to make additional templates for which purpose it will hereinafter be referred to as master saw blank 20a.

If it is desired to produce a master saw blank directly by use of tapered strips, the strips are placed on the magnetic chuck 18 in a manner similar to that shown in Figure 6, except that the thinner ends of the strips form a convex arc. Plate 20 is placed on the strips, as shown in Figure 10, and ground in the same manner as before.

To produce templates from a master saw blank, the blank 20a is placed on the magnetic chuck 18. A plate 21, similar in size and shape to plates 19 and 20 is placed on top and the assembly held fast by the magnetic action of the chuck 18. This is illustrated by Figures 11 and 12. Blank 20a and plate 21 are so positioned that the lightest cut on plate 21 is taken at the center of the straight edge, and a heavier cut is taken at the curved edge and ends of the plate. A grinding wheel is passed back and forth over the surface as previously described.

The ground plate, hereinafter referred to as template 21a has a contoured surface which is the converse of the upper surface of the master saw blank 20a, or an exact replication of the upper surface of template 19a. The plate 20 is thus ground to produce a master saw blank 20a, utilized for grinding template 21a, which in turn is used to make a plurality of saw blades.

It may be found desirable to provide two master saw blanks for the forming of a pair of templates, used simultaneously in producing saw blades, and by the use of which templates an equal amount of material may be ground from both sides of the saw blades. These templates may be formed in the manner just described, the difference lying in the fact that, as shown in Figure 13, first operation template 22 has less taper and is thinner than second operation or finishing template 19a or 21a. Consequently substantially identical segments of material are removed from rough blank 23 and semi-finished blank 23a which has been turned over to receive a finishing cut on the other side thereof.

With this invention, numerous advantages are obtained. Templates may be made with comparative ease and in such manner that tolerance variation may be held to a minimum. The invention has the further advantage that the template and saw blank made therefrom are accurately and correctly provided with a compound taper and, being rigidly held, are not subject to variations inherent by reason of the use of other methods. A further advantage arises from the fact that the toothed edge of a saw blade formed by this method will be of the same thickness throughout its length.

As illustrated in Figures 2 to 4 inclusive, which represent sections taken through a saw blade from the toothed edge 15 upwardly to the back edge 16, any section taken through the saw blade, normal to the toothed edge, will result in a trapezoid. As also shown by these figures, the sides of the sections of the saw blade are substantially straight lines and are not curved or barrel-shaped. Numerous other novel and advantageous features will be apparent.

What is claimed is:

1. The method of producing a compound taper on a saw blade which comprises placing a plurality of tapered strips, each rectangular in plan, on a flat surface, in edge-to-edge relation, so that one set of similar ends of the strips are touching and the other ends are slightly separated, removably securing a flat plate on the surface collectively formed by said strips, and then removing the raised portions of the plate, whereby the surface of the plate will assume the converse of the surface defined by the strips.

2. The method of producing a compound taper on a saw blade which comprises placing a plurality of tapered strips, each rectangular in plan, on a flat surface, in edge-to-edge relation so that one set of similar ends of the strips are touching, and the other ends are slightly separated, removably securing a flat plate on the surface collectively formed by the said strips, and then passing grinding means in a straight line over the exposed surface of such plate whereby the ground surface of the plate will assume the converse of the surface defined by the flat strips.

3. The method of producing a compound taper on a saw blade which comprises placing a plurality of tapered strips, each rectangular in plan, on a flat surface, in edge-to-edge relation, so that one set of similar ends of the strips are touching and the other ends are slightly separated, removably securing a flat plate on the surface collectively formed by the said strips, and then removing the raised portions of the plate, whereby the surface of the plate will assume the converse of the surface defined by the strips, and utilizing said plate as a template for similarly treating the surfaces of saw blade blanks.

4. The method of producing a compound taper on a saw blade which comprises placing a plurality of tapered strips, each rectangular in plan, on a flat surface, in edge-to-edge relation, so that one set of similar ends of the strips are touching, and the other ends are slightly separated, removably securing a flat plate on the surface collectively formed by the said strips, and then passing grinding means in a straight line over the exposed surface of such plate whereby the ground surface of the plate will assume the converse of the surface defined by the strips, and utilizing such ground plate for similarly grinding the surfaces of saw blade blanks.

5. The method of producing a compound taper on a saw blade which comprises placing a plurality of tapered strips, each rectangular in plan, on a flat surface, in edge-to-edge relation so that one set of similar ends of the strips are touching, and the other ends are slightly separated, removably securing a flat plate on the surface collectively formed by the said strips, and then passing a grinding wheel over the exposed surface of such plate whereby the ground surface of the plate will assume the converse of the surface defined by the strips.

6. Apparatus for producing saw blades and saw blade templates by grinding comprising, in combination, a flat surface magnetic chuck and a plurality of thin flat strips, each of said strips being rectangular in plan and having a greater thickness at one end than at the other end, being tapered linearly between these extremes, said strips being positioned in organized assembly on said flat surface, with a flat rectangular surface of each strip resting on said flat surface, and juxtaposed with one set of similar ends spaced farther apart than the opposite set of similar ends, in such manner that the said strips collectively form a curved surface of support.

7. Apparatus for producing a template for grinding saw blades comprising, in combination, a flat surface magnetic chuck and a plurality of thin tapered strips, each of which strips is rectangular in plan, said strips being assembled on said flat surface in edge-to-edge relation, disposed with one set of similar ends touching, and the other ends slightly separated, the sides of the strips opposite said flat surface collectively forming a substantially conical surface.

8. Apparatus for producing saw blades and saw blade templates by grinding comprising, in combination with a magnetic chuck, a plurality of tapered strips, each of which strips is rectangular in plan, disposed in edge-to-edge relation on the said magnetic chuck with one set of similar ends touching, and the other ends slightly separated, the sides of the strips opposite said flat surface collectively forming a surface having the reverse contour from that to be produced.

References Cited in the file of this patent

UNITED STATES PATENTS

| Number | Name | Date |
|---|---|---|
| 106,071 | Mefford | Aug. 2, 1870 |
| 269,729 | Simonds | Dec. 26, 1882 |
| 346,565 | Simonds | Aug. 3, 1886 |
| 643,914 | Shaw | Feb. 20, 1900 |
| 1,171,818 | Walpole | Feb. 15, 1916 |
| 1,338,178 | Henderson | Apr. 27, 1920 |
| 1,381,478 | Lawrence | June 14, 1921 |
| 1,654,000 | Hirst | Dec. 27, 1927 |
| 2,056,491 | Stimson | Oct. 6, 1936 |
| 2,104,472 | St. Clair et al. | Jan. 4, 1938 |
| 2,371,515 | Gorman | Mar. 13, 1945 |
| 2,378,243 | Penberthy | June 12, 1945 |
| 2,383,638 | Faber | Aug. 28, 1945 |
| 2,390,978 | Woodbury | Dec. 11, 1945 |
| 2,536,864 | Strickland et al. | Jan. 2, 1951 |

FOREIGN PATENTS

| Number | Country | Date |
|---|---|---|
| 561,561 | Great Britain | May 24, 1944 |